United States Patent Office 2,735,401
Patented Feb. 21, 1956

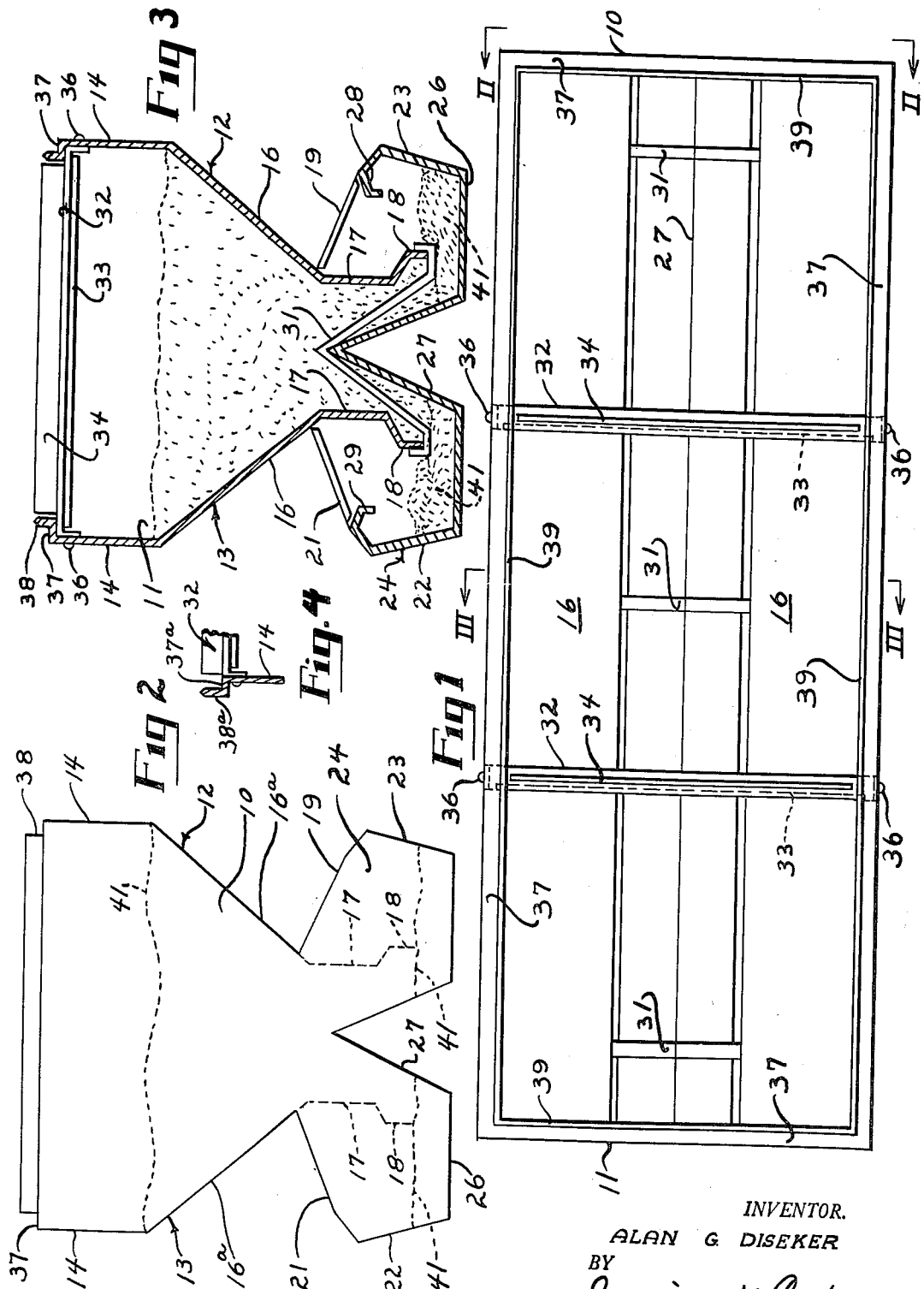

2,735,401

POULTRY FEEDER

Alan G. Diseker, Decatur, Ala.

Application October 19, 1953, Serial No. 386,687

1 Claim. (Cl. 119—52)

This invention relates to a poultry feeder and more particularly to a hopper and feed trough construction which shall be particularly adapted for feeding both large and small birds at the same time.

Another object of my invention is to provide a poultry feeder which shall embody improved means preventing the birds from resting thereon and depositing droppings in the feed, thereby, maintaining the feed in a clean condition.

A further object of my invention is to provide a poultry feeder of the character designated which shall embody improved means for maintaining even gravity flow of feed from a hopper unit and means for distributing the feed evenly into feed troughs along the sides thereof.

A still further object of my invention is to provide a poultry feeder of the character designated which shall be sturdy of construction, economical of manufacture and one which readily lends itself to mass production.

Heretofore in the art to which my invention relates various poultry feeders have been proposed. However, so far as I am aware, none have been adapted for feeding for large and small birds at the same time. Also, no effective means have been provided to obviate the practice of birds to rest on the top of feeders and contaminate the feed therein.

Briefly, my improved poultry feeder comprises an open top hopper unit having sharp upwardly extending members along the upper edges thereof. The side walls of the hopper converge downwardly and the lower edges thereof flare outwardly to provide an even flow of feed into a subjacent trough. Means are also provided in the trough for distributing the feed evenly over the bottom thereof and removable reinforcing members are provided at the lower edge of the hopper.

A feeder embodying features of my invention is shown in the accompanying drawing forming a part of this application in which:

Fig. 1 is a plan view thereof;

Fig. 2 is an end view, taken along the line II—II of Fig. 1;

Fig. 3 is a sectional view taken along the line III—III of Fig. 1; and,

Fig. 4 is an enlarged fragmental view showing a modification of my feeder.

Referring now to the drawing for a better understanding of my invention, I show a hopper unit formed of relatively, thin sheet material and embodying end walls 10 and 11 and side walls 12 and 13. In actual practice, I find that cold rolled sheet metal on the order of 26 gage is satisfactory in every respect for the construction of my feeder. The side walls have vertically extending upper portions 14, downwardly converging portions 16 and vertically extending lower portions 17 having outwardly and downwardly flaring lips 18.

The end walls 10 and 11 have downwardly converging portions 16a and flare outwardly as at 19 and 21 and thence downwardly and inwardly to form the end walls of a feed trough 24 having side walls 22 and 23 and a bottom wall 26. The side walls of the trough 24 are joined to the end walls 10 and 11 by any suitable means such as by bolting, lock forming, soldering or welding. The bottom of the trough is provided with an inverted V-shaped ridge portion 27 at the longitudinal center which extends upwardly between the lower vertical portions 17 of the hopper, as shown in Fig. 3. The upper ends of the side walls 22 and 23 of the trough extend inwardly and downwardly as at 28 and 29 respectively, thus preventing waste of feed and providing a scraping surface against which the underside of the beaks of the birds may be scraped as they withdraw their heads from the feed trough. Reinforcing straps 31 pass over the ridge 27 at spaced intervals and hook under the lower edges of the outwardly flaring lips 18, thus providing a rigid construction and permitting the hopper to be supported along the length thereof. To add further strength to the feeder, a plurality of laterally extending brace members 32 are provided. The brace members 32 are provided with downwardly extending flanges 33 and upwardly extending flanges 34. The members 32 are secured to the hopper unit by suitable means such as rivets or bolts 36.

The upper end of the hopper unit is turned inwardly as at 37 and upwardly as at 38 thus providing a relatively sharp upper edge 39 which prevents the birds from resting on top of the feeder and thereby contaminating the feed therein. The upper edges of the flanges 34 are also sharp to prevent the birds from resting thereon.

From the foregoing description the use of my improved poultry feeder will be readily understood. The feed indicated at 41 is placed in the hopper where it flows downwardly between the inwardly converging side walls 12 and 13 into the trough 24. The lower vertical portions 17 are spaced apart to permit the required amount of feed to pass therebetween. The outwardly and downwardly flaring lips 18 at the bottom of the hopper cause the feed to flow evenly into the trough. Small birds may feed out of the trough 24 while the larger birds will feed out of the hopper unit intermediate the brace members 32. I have found in actual practice that by providing relatively sharp upwardly extending members at the top of the feed hopper, the birds do not contaminate the feed although the large ones feed directly out of the hopper unit. Also by keeping the level of the feed no higher than the line indicated, the birds will not scratch out any feed.

From the foregoing it will be seen that I have devised an improved poultry feeder which is adapted for feeding large and small birds at the same time. By providing relatively sharp upwardly extending members around the entire upper edge of the feed hopper and along the upper brace members 32, the birds do not rest on the top of the feeder and contaminate the feed therein. Also, by providing removable brace members which support the lower end of the feed hopper at intervals, I have provided a feeder which is very sturdy in construction. Furthermore, by providing outwardly flaring lips which extend along the lower longitudinal edges of the hopper, the feed flows evenly into the feed trough.

As shown in Fig. 4, the upper end of the hopper unit may be turned outwardly as at 37a and upwardly as at 38a instead of being turned inwardly and upwardly.

While I have shown the feeder as being without legs, I contemplate using adjustable leg members where it is desired to raise the feeder as the birds grow larger.

While I have shown my invention in but two forms, it will be obvious to those skilled in the art that it is not so limited, but is susceptible of various changes and modifications without departing from the spirit thereof, and I desire, therefore, that only such limitations shall be placed thereupon as are specifically set forth in the appended claim.

What I claim is:

A poultry feeder comprising an open top feed hopper having end walls and downwardly converging side walls, a feed trough beneath said hopper and communicating therewith, an inverted V-shaped ridge in the bottom of said trough along the longitudinal center thereof, and removable support members of substantially inverted V-shape extending over said ridge with the free ends thereof engaging beneath the lower edges of said hopper and terminating in upwardly extending hook portions positioned outwardly of said lower edges whereby the hopper is supported along the length thereof.

References Cited in the file of this patent

UNITED STATES PATENTS

| | | |
|---|---|---|
| 1,036,882 | Moore | Aug. 27, 1912 |
| 1,066,710 | Clarke | July 8, 1913 |
| 1,193,165 | McCollough | Aug. 1, 1916 |
| 1,234,731 | Clarke | July 31, 1917 |
| 1,240,864 | McCollough | Sept. 25, 1917 |
| 1,336,320 | Schumacher | Apr. 6, 1920 |
| 1,463,862 | Wolf | Aug. 7, 1923 |
| 1,593,705 | Nebergall | July 27, 1926 |
| 1,836,274 | Norton | Dec. 15, 1931 |
| 2,116,361 | Nasman | May 3, 1938 |
| 2,642,838 | Fields | June 23, 1953 |